United States Patent
Gupta et al.

(10) Patent No.: US 9,647,924 B2
(45) Date of Patent: May 9, 2017

(54) PROPAGATING LDP MAC FLUSH AS TCN

(71) Applicant: Juniper Networks, Inc., Sunnyvale, CA (US)

(72) Inventors: Manish Gupta, San Jose, CA (US); Ramasamy Ramanathan, Santa Clara, CA (US); Sri S. Goli, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 281 days.

(21) Appl. No.: 14/456,250

(22) Filed: Aug. 11, 2014

(65) Prior Publication Data

US 2014/0348027 A1 Nov. 27, 2014

Related U.S. Application Data

(63) Continuation of application No. 12/971,866, filed on Dec. 17, 2010, now Pat. No. 8,804,570.

(51) Int. Cl.
| | |
|---|---|
| *H04L 12/28* | (2006.01) |
| *H04L 12/751* | (2013.01) |
| *H04L 12/54* | (2013.01) |
| *H04J 3/14* | (2006.01) |
| *H04L 12/723* | (2013.01) |

(52) U.S. Cl.
CPC .............. *H04L 45/02* (2013.01); *H04J 3/14* (2013.01); *H04L 12/56* (2013.01); *H04L 45/507* (2013.01)

(58) Field of Classification Search
CPC ................................. H04L 12/16; H04L 12/28
See application file for complete search history.

(56) References Cited

U.S. PATENT DOCUMENTS

| | | | |
|---|---|---|---|
| 6,952,396 B1 | 10/2005 | Cottreau et al. | |
| 7,782,763 B2 | 8/2010 | Balus et al. | |
| 8,166,151 B2 | 4/2012 | Tsillas | |
| 8,170,033 B1 | 5/2012 | Kothari et al. | |
| 8,255,575 B2 | 8/2012 | Sakurai | |
| 8,804,570 B1 | 8/2014 | Gupta et al. | |
| 2004/0174828 A1* | 9/2004 | Elie-Dit-Cosaque | H04L 12/4625 370/254 |
| 2008/0225695 A1* | 9/2008 | Balus | H04L 12/462 370/216 |
| 2009/0144403 A1* | 6/2009 | Sajassi | H04L 12/4625 709/223 |
| 2009/0154463 A1 | 6/2009 | Hines et al. | |
| 2010/0226260 A1 | 9/2010 | Zinjuvadia et al. | |
| 2010/0290340 A1 | 11/2010 | Lee et al. | |
| 2012/0020206 A1* | 1/2012 | Busi | H04L 12/24 370/217 |

\* cited by examiner

*Primary Examiner* — Robert M Morlan
*Assistant Examiner* — Nourali Mansoury
(74) *Attorney, Agent, or Firm* — Harrity & Harrity, LLP

(57) ABSTRACT

A first provider edge (PE) device is configured to: receive a Label Distribution Protocol (LDP) MAC Flush message from a PE device via an input port; flush a routing table in response to the LDP MAC Flush message; determine whether the LDP MAC Flush message comprises a PE identifier corresponding to the PE device; generate a Topology Change Notification (TCN) message based on the LDP MAC Flush message when the LDP MAC Flush message comprises the PE identifier corresponding to the PE device; and output the TCN message.

20 Claims, 8 Drawing Sheets

PROPAGATING LDP MAC FLUSH AS TCN

RELATED APPLICATION

This application is a continuation of U.S. patent application Ser. No. 12/971,866, filed Dec. 17, 2010 (now U.S. Pat. No. 8,804,570), the disclosure of which is incorporated herein by reference.

BACKGROUND

A local area network (LAN) may include a computer network covering a small physical area that may connect electronic devices, such as computers, printers, switches, routers, telephones, firewalls, or other electronic devices. A LAN may communicate using Ethernet technology and may provide high data transfer rates, the ability to share peripheral devices, increased security, and sharing of data and applications from a central location. A customer may operate two or more LANs on different customer sites that are physically remote and may desire to combine the customer sites into a single network. A network service provider may provide a virtual private LAN service (VPLS) over a network (e.g., the Internet), which may emulate a point-to-point LAN connection over the network, allowing the physically remote LANs to behave as if part of a single Ethernet domain.

In VPLS environments, there may be instances when a single customer site is multi-homed (e.g., dual-homed) to two or more provider edge (PE) devices that are on/connected to a VPLS core (network) in order to provide redundant connectivity. A PE device may include any network element with routing functions (e.g., a router). Each one of the PE devices may be connected to a corresponding customer edge (CE) device on/connected to a customer site (e.g., a LAN). A CE device may include a switch or a router that acts as a gateway from the customer site to the VPLS (service provider's network).

One PE device may act as a primary PE device for connecting the customer site to the VPLS core, and the other PE device may serve as a backup PE device. The primary PE device and the backup PE device may participate in a spanning tree protocol (STP) to create only one spanning tree (ST) for the customer site. The primary PE device may act as a root bridge to create a connection between the primary PE device and the corresponding CE device, connecting the customer site to the core VPLS (by the primary PE device forwarding data/packets it receives). The backup PE device may block its port connecting it to its corresponding CE device in order to block a redundant connection between the customer site and the core VPLS.

When a break (e.g., connection failure) occurs on the customer site, the customer site may split into two separate sites/networks (e.g., site 1*a* and site 1*b*). Site 1*a* may be connected to the core VPLS through the original primary PE device and the corresponding CE device located on/connected to site 1*a*. Once the break occurs, an STP on site 1*b* may cause the original backup PE device to unblock (i.e., also become a root bridge) to connect site 1*b* to the core VPLS through the original backup PE device and the corresponding CE device located on site 1*b*. The unblocking (e.g., topology change event) may prompt the original PE device to send out message(s) (e.g., Topology Change Notification (TCN) message(s)) to flush all of the media access control (MAC) tables on site 1*b*. MAC tables may identify routes to destination device(s) (e.g., end hosts (devices) on/connected to site 1*a*). Flushing allows devices to relearn all the MAC addresses and the corresponding proper routes to other devices.

However, since the original primary PE device may continue to operate normally (e.g., no topology event is observed), the original primary PE may not send out a message to flush all the MAC tables on site 1*a*. As a result, devices on site 1*a* will not be able to send packets/data to devices on site 1*b*. The devices on site 1*a* may initially send out packets via routes based on information that existed before the break, and the data/packets will be dropped. The devices on site 1*a* may keep resending the packets based on the wrong routes until the devices receive traffic from site 1*b* or MAC aging occurs. MAC aging may occur when a MAC address is not used during a predefined period of time. The MAC table may flush out the corresponding information after the predefined period of time. In both cases, resources (used by resending the packet) and time may be wasted.

An STP (PWs) may be run, not only over the original customer site, but also over the VPLS core and other customer sites connected to the VPLS core to prompt MAC flushes at all sites. As a result, the original customer site, the VPLS core, and the other sites may become one big ST. This may create scaling issues, prompt unnecessary flushes of other customer sites, slow down the sites and the VPLS, and exert more resources. Furthermore, in many cases, STs may be run locally on each site and extending the ST may not be possible.

SUMMARY

According to one aspect, a method may include: detecting a topology change event; unblocking a port of a first provider edge (PE) device in response to the topology change event; generating a first message based on the unblocking of the port, where the first message comprises information to prompt a second PE device to flush a routing table of the second PE device and to prompt the second PE device to generate a second message to transmit to a first customer edge (CE) device directly connected to the second PE device; transmitting the first message to the second PE device; and receiving a packet, sent by an end host connected to a site corresponding to the second PE device, from the second PE device.

According to another aspect, a non-transitory computer-readable medium may store a program for causing a computer to perform a method. The method may include: receiving a first message from a first provider edge (PE) device; flushing a first routing table maintained by a second PE device in response to the first message; determining whether the first message identifies the second PE device; generating a Topology Change Notification (TCN) message when the first message identifies the second PE device; and transmitting the TCN message to a first customer edge (CE) device directly connected to the second PE device, where the TCN message prompts devices connected to a first ring corresponding to the first CE device to flush their routing tables.

According to yet another aspect, a first provider edge (PE) device may include an input port; a storage device to store a first routing table; and a processor. The processor may receive a first message from a second PE device via the input port; flush the first routing table in response to the first message; determine whether the first message comprises a PE identifier corresponding to the first PE device; generate a Topology Change Notification (TCN) message based on the first message when the first message comprises the PE identifier corresponding to the first PE device; and output the TCN message.

According to still yet another aspect, a method may include: determining a topology change event; generating a first Topology Change Notification (TCN) message in response to the topology change event; transmitting the first TCN message to a first customer edge (CE) device directly connected to the first provider edge (PE) device; generating a first Label Distribution Protocol (LDP) MAC flush message in response to the topology change event; and transmitting the first LDP MAC flush message to a second PE device, where the first LDP MAC flush message comprises information to prompt the second PE device to generate a second TCN message and to transmit the second TCN message to a second CE device directly connected to the second PE device.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

An implementation described herein may propagate an LDP MAC flush message as a TCN message. After a break in a customer site, previously dual-homed to a VPLS core, a PE device that unblocked due to the break may generate an LDP MAC flush message. The PE device may forward the LDP MAC flush message to other PE devices on/connected to the VPLS core. A (formerly primary) PE device that was connected to (served as a root bridge to) the original customer site may receive the LDP MAC flush message and generate a TCN message based on the LDP MAC flush message. The PE device that generated the TCN message based on the LDP MAC flush message may transmit the TCN message to a corresponding CE device. The CE device may be connected to a new site that was originally part of the broken customer site. The CE device may forward the TCN message to other devices on/connected to the new site for the devices to flush their MAC tables based on the TCN message.

Figure 1:
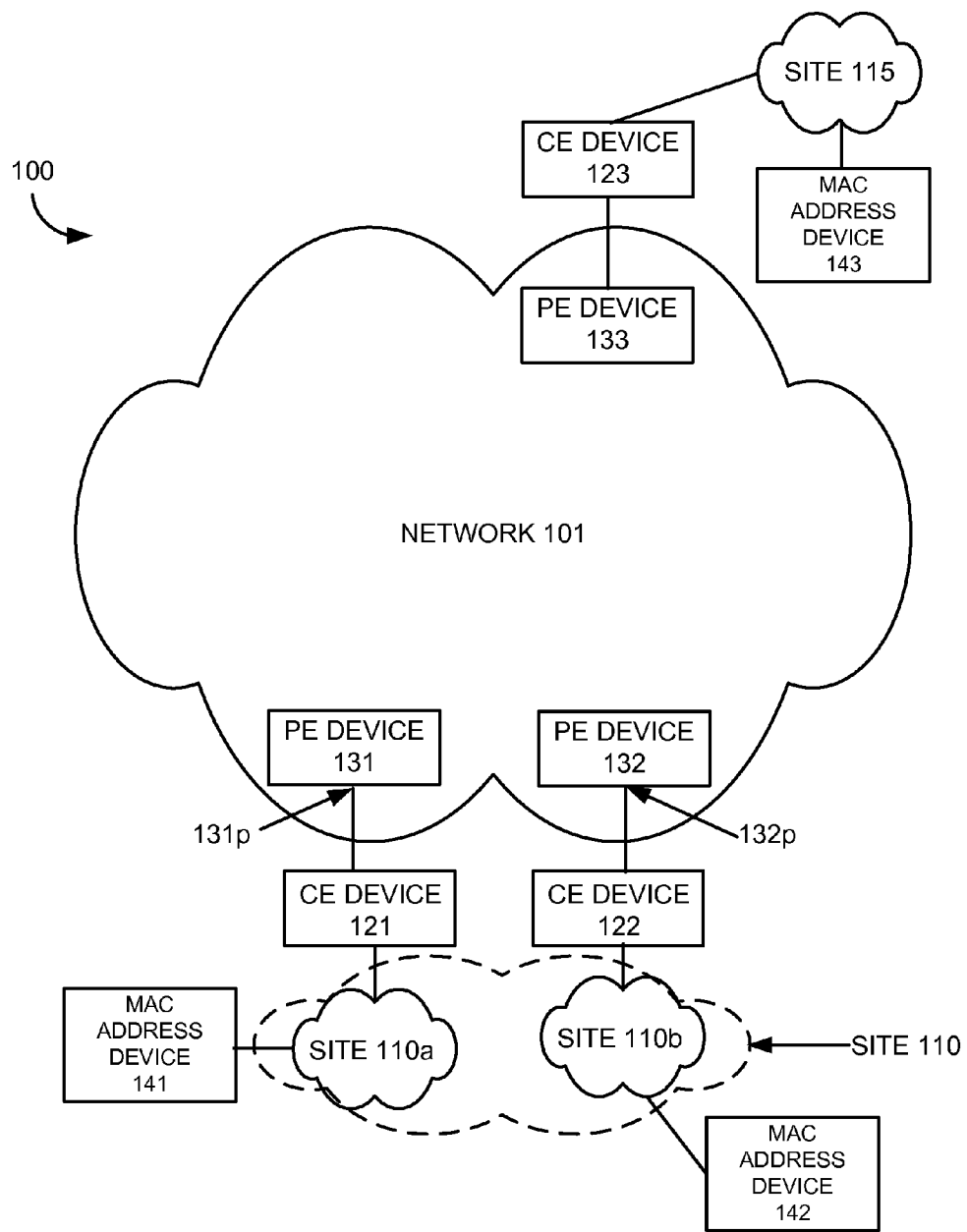
FIG. 1 is a diagram of an example system according to an implementation described herein.

FIG. 1 is a diagram of an example system 100 according to an implementation described herein. System 100 may include one or more of the following elements: a network 101 (also referred to as the VPLS core), a site 110 (also referred to as the original customer site), a site 115 (also referred to as the remote site), a CE device 121 (also referred to as the CE device corresponding to the primary PE device), a CE device 122 (also referred to as the CE device corresponding to the backup PE device), a CE device 123, a PE device 131 (also referred to as the primary PE device), a PE device 132 (also referred to as the backup PE device), a PE device 133, a MAC address device 141, a MAC address device 142, and a MAC address device 143. Site 110 may split into a site 110a and a site 110b after a break (e.g., connection failure) of a link in site 110. PE device 131 may include a port 131p, and PE device 132 may include a port 131p.

Network 101 may represent a core of a VPLS for components of system 100 and may include other customer sites not shown in FIG. 1. Network 101 may allow end hosts (e.g., MAC address devices 141, 142, and 143) on different sites, including site 110 and site 115, to communicate as though they were on the same LAN. Network 101 may include a single network, multiple networks of a same type, or multiple networks of different types. For example, network 101 may include a LAN, a wide area network (WAN), a metropolitan area network (MAN), a wireless network, such as a general packet radio service (GPRS) network, an ad hoc network, a public switched telephone network (PSTN), a subset of the Internet, any other network, or any combination thereof. Network 101 may also include a variety of switching and/or routing devices beside PE devices 131-133.

Each one of site 110 and site 115 may include one or more LANs (or other types of networks) that are connected together. Each one of site 110 and site 115 may correspond to a separate physical location. Sites 110 and 115 may include a variety of switches, routers, etc. that connect MAC address devices 141, 142, and 143 to other parts of the VPLS-based network. A break may occur at site 110 (e.g., a break may occur between two switches/routers of site 110) that may split site 110 into two separate sites, site 110a and site 110b, that do not have a direct connection. Each one of site 110a and site 110b may represent a separate LAN.

Each one of CE devices 121, 122, and 123 may include any device with switching or routing functions (e.g., a layer 2 or a layer 3 device), and may connect one of site 110a, site 110b, and site 115, respectively, to network 101. Each one of PE devices 131, 132, and 133 may include any network device with routing functions (e.g., a layer 3 device), and may connect one of CE devices 121, 122, and 123, respectively, to network 101.

Before a break in site 110, site 110 may be dual-homed to network 101 through CE devices 121 and 122 and PE devices 131 and 132. Each one of ports 131p and 132p may block or allow a connection through one of PE devices 131 and 132, respectively, from site 110 to network 101. A protocol (e.g., an election protocol, an STP, etc.) may run to determine which one of ports 131p and 132p may not block and allow a corresponding one of devices 131 and 132 to act as a (root) bridge (connection) between site 110 and network 101. The other one of ports 131p and 132p may be blocked and not allow a corresponding one of PE devices 131 and 132 to act as a bridge (and not allow communication through the PE device between site 110 and network 101). Only one of PE devices 131 and 132 may act as a bridge at one time between site 110 and network 101.

For example, before the break, port 131p may be unblocked and PE device 131 may act as a root bridge between site 110 and network 101. At the same time, port 132p may block and not allow any communication from CE device 122 to reach PE device 132. After the break of site 110 into site 110a and site 110b, a protocol (e.g., an STP) may run that would unblock port 132p and allow PE device to be a root bridge between site 110b and network 101. PE device 131 may continue to act as a root bridge, and would now be the root bridge for communication between site 110a and network 101.

MAC address devices 141, 142, and 143 (herein, also referred to as hosts and end hosts) may include any device with a MAC address, such as a computer, a server, a microcontroller, an input or output device (e.g., a printer, a display device, a camera, or a sensor), or any other electronic device with communication capabilities. Before the break, MAC address device 141 may send a packet to MAC address device 142 through site 110. The packet may be routed based on routing tables (e.g., MAC tables) maintained by MAC address device 141 and other switches on the route. After the break in site 110, a packet may only be routed from MAC address device 141 to MAC address device 142 through site 110a, network 101, and site 110b. The term "packet," as used herein, may refer to and be used interchangeably with request, response, message, ping, traffic, data, datagram, or cell; a fragment of a packet, a fragment of a datagram, a fragment of a cell; or another type, arrangement, or packaging of data.

If a MAC table is incorrect, a device/switch may route a packet to a point where there may be no connection any longer (e.g., a link broke at the point) and the packet may be dropped. The device that originally sent out the packet may keep trying to resend the packet. If any device (e.g., a MAC address device, a switch, any PE device, etc.) does not know a route for a packet (i.e., does not have any entry in its MAC table for the destination device), the device may flood the packet in all possible directions. A device/switch may learn a route to a MAC device (i.e., add an entry to its MAC table for the MAC device) after receiving a packet/response from the MAC device.

Figure 2:
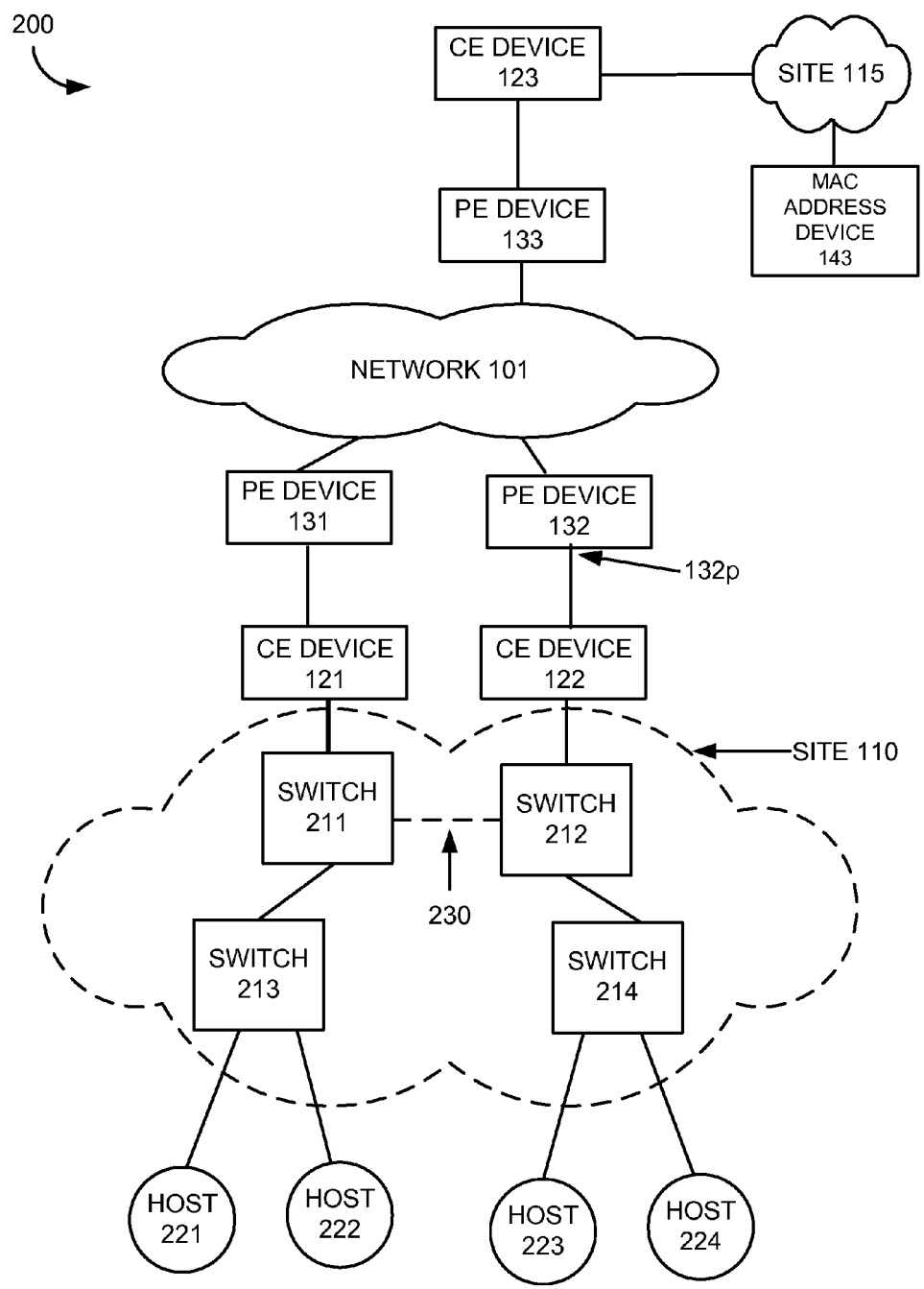
FIGS. 2 and 3 are diagrams illustrating examples of operation of the system illustrated in FIG. 1.

FIG. 2 is a diagram illustrating an example of operation 200 of system 100 illustrated in FIG. 1. Site 110, shown in FIG. 2, may correspond to site 110 shown in FIG. 1. Site 110 may include a switch 211, a switch 212, a switch 213, and a switch 214. Switch 211 and switch 213 in FIG. 2 may correspond to (be part of) site 110a shown in FIG. 1. Switch 213 may be connected to multiple end hosts (e.g., MAC address devices), including a host 221 and a host 222. Each one of host 221 and host 222 may correspond to MAC address device 141 in FIG. 1. Switch 212 and switch 214 in FIG. 2 may correspond to (be part of) site 110b shown in FIG. 1. Switch 214 may be connected to multiple end hosts (e.g., MAC address devices), including a host 223 and a host 224. Each one of host 223 and host 224 may correspond to MAC address device 142 in FIG. 1.

Site 110 may include a link 230 (e.g., an Ethernet connection) between switch 211 and switch 212. When switch 211 and switch 212 are able to communicate directly via link 230, host 221, for example, may transmit a packet to host 224 through switch 213, switch 211, link 230, switch 212, and switch 214. A break in link 230 may break the connection between switch 211 and switch 212. As a result, site 110 may break into site 110a and site 110b. After the break, data may be sent from/to hosts 221 and 222 to/from hosts 223 and 224 through network 101. For example, host 221 may transmit a packet to host 224 through switch 213, switch 211, CE device 121, PE device 131, network 101, PE device 132, CE device 122, switch 212, and switch 214.

After the break, an STP protocol may run for site 110b that may determine that port 132p needs to be unblocked. The unblocking of port 132p may allow PE device 132 to become a root bridge, allowing packets to be able to be transmitted to and from site 110b. This may trigger a topology change event in PE device 132. As a result, PE device 132 may generate/prepare a TCN message (herein "TCN 1") to transmit to CE device 122 and an LDP MAC flush message to transmit to other PE devices, including PE device 131 and PE device 133, that are connected to network 101 along with PE device 132.

PE device 132 may transmit TCN 1 to CE device 122. CE device 122 may forward TCN 1 through switch 212 and switch 214 to host 223 and host 224. TCN 1 may prompt all devices connected to site 110b, including switches 212 and 214 and hosts 223 and host 224, to flush their MAC tables. As a result, packets sent by host 223 and/or host 224 to one of host 221 and host 222 will not be dropped by switch 212 trying to send them through link 230 (that is no longer operational). Instead, initially, switch 212 may flood the packet in all directions, including to CE device 122, for the packet to eventually reach host 221 or host 222.

PE device 132 may transmit the LDP MAC flush message to PE device 131 and PE device 133. In response, PE device 131 and PE device 133 may flush their own MAC tables. The LDP MAC flush message may also prompt (trigger) a receiving PE device (e.g., PE device 131) to generate its own TCN message (herein "TCN 2") to send to its corresponding CE device (e.g., CE device 121). Otherwise, before receiving TCN 2, switch 211, switch 213, host 221, and host 222 connected to (on) site 110a may continue to act as though a break of link 230 did not occur. As a result, without TCN 2, host 221, for example, may attempt to transmit a packet to one of host 223 and host 224 through broken link 230. The packet would be dropped by switch 211 and would never reach the intended one of host 223 and host 224. Host 221 may continue trying to resend the packet. In order to prevent this from occurring, the LDP MAC flush message may prompt PE device 131 to generate TCN 2. PE device 131 may transmit TCN 2 to CE device 121. CE device 121 may forward TCN 2 to switch 211, switch 213, host 221, and host 222 that are all on/connected to site 110a. TCN 2 may prompt all the devices on/connected to site 110a, including CE device 121, switches 211 and 213, and hosts 221 and 222, to flush their MAC tables. As a result, a packet from host 221, for example, may transmit a packet to host 223 and/or host 224 through network 101, without the packet being dropped by switch 211.

However, it may be unnecessary for some of the PE devices (e.g., PE device 133) receiving the LDP MAC flush message from PE device 132 to generate their own TCN 2 and transmit the TCN 2 to their corresponding CE devices (e.g., CE device 123). PE device 133 may be connected through CE device 123 to (remote) site 115. Site 115 may not have been part of the now broken site 110. As a result, the break of link 230 may not affect how packets are/should be transmitted from site 115 (e.g., MAC address device 143) to hosts 221-224 that are now connected to one of site 110a or site 110b. For example, MAC address device 143 may transmit a packet through site 115, CE device 123, PE device 133, and network 101 for the packet to reach one of hosts 221-224 both before and after the break of link 230. If PE device 133 were to send a TCN 2 to CE device 123 in response to the LDP MAC flush message received from PE device 132, then devices on/connected to site 115, including MAC address device 143 would unnecessarily flush their MAC tables and would have to relearn all the same routing information.

As a result, the LDP MAC flush message sent from PE device 132 may specify what PE devices receiving the LDP MAC flush message should generate and transmit a TCN 2 message. In another implementation, PE devices receiving the LDP MAC flush message may determine based on the origin of the message whether they should generate a TCN 2.

For an LDP MAC flush message to specify what receiving PE device needs to generate a TCN 2 (e.g., PE device 131), PE device 132 may first determine an identifier (herein "PE ID") corresponding to PE device 131. In one implementation, PE device 132 may store a PE ID corresponding to PE device 131. It may be pre-configured that when PE device 132 generates an LDP MAC flush message it will include the PE ID of PE device 131 in the LDP MAC flush message. In another implementation, a protocol (e.g., STP) may run to determine the PE ID of PE device 131 to be included, by PE device 132, in the LDP MAC flush message. The protocol may run after the break of link 230. PE device 132 may generate the LDP MAC flush message based on the determined PE ID of PE device 131. As discussed above, PE device 132 may transmit, through network 101, the LDP MAC flush message to PE device 131 and PE device 133.

PE device 131 may flush its MAC table in response to the LDP MAC flush message. PE device 131 may also determine whether it should generate a TCN 2 based on whether the LDP MAC flush message includes a PE ID of PE device 131. PE device 131 may transmit TCN 2 to CE device 121. CE device 121 may flush its own MAC table and forward TCN 2 for all other MAC tables, stored/managed by devices on/connected to site 110*a*, to also be flushed. Thereafter, for example, host 221 may transmit a packet through network 101 to host 224. Host 224 may transmit a response to the packet back to host 221 through network 101. Devices, with the flushed MAC tables, on/connected to site 110*a* (e.g., switch 211 and switch 213) that handle the routing of the response back to host 221 may learn routing information for host 224, and fill their MAC tables based on the information.

PE device 133 may also flush its MAC table in response to the LDP MAC flush message received from PE device 132. However, PE device 133 may determine based on the LDP MAC flush message that it should not generate and transmit a TCN 2 to CE device 123 to be forwarded throughout site 115. PE device 133 may make the determination based on the fact that a PE ID of PE device 133 is not included in the LDP MAC flush message. As a result, MAC tables of devices on/connected to site 115 may be not needlessly flushed when MAC tables of devices on/connected to site 110*a* are flushed.

Figure 3:
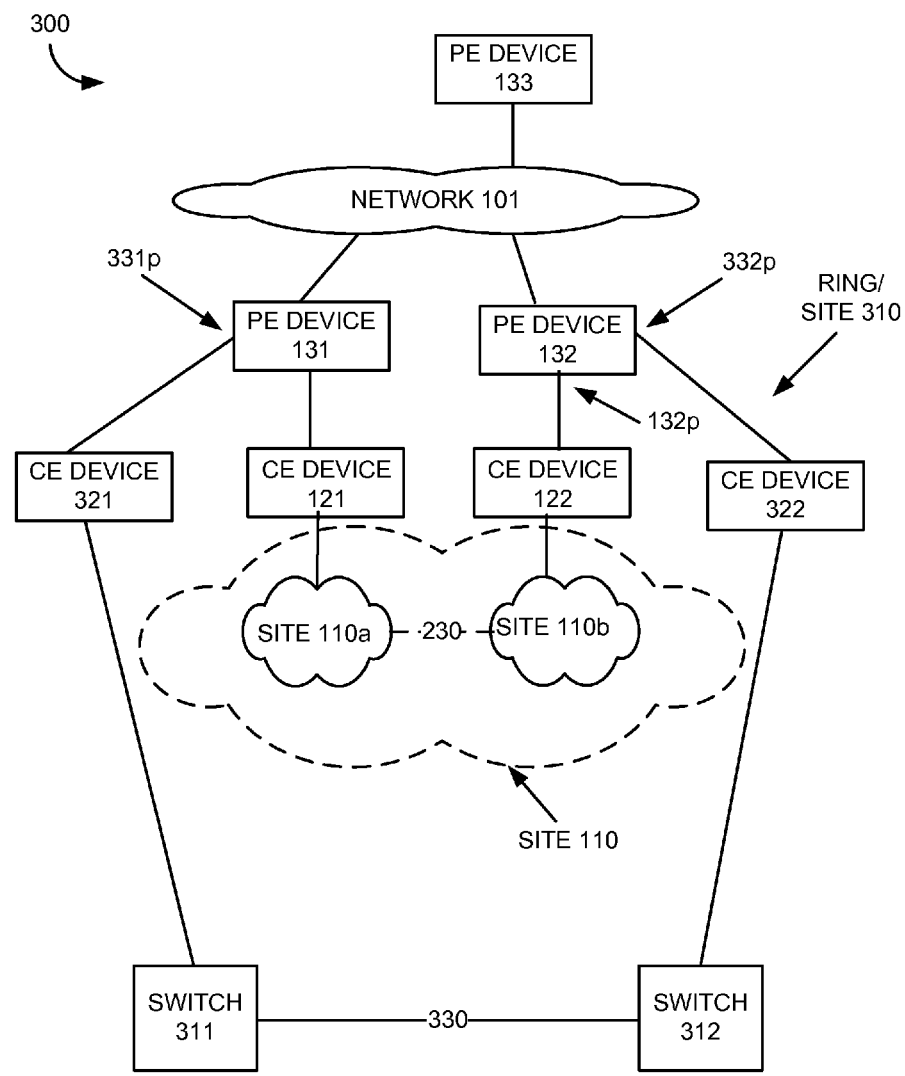

FIG. 3 is a diagram illustrating an example of operation 300 of system 100 illustrated in FIGS. 1 and 2. In one implementation, system 100 may also include a ring 310. Ring 310 may include a CE device 321, a CE device 322, a switch 311, and a switch 312. A link 330 may directly connect switch 311 and switch 330. Ring 310 may represent a separate site 310 that is analogous to site 110 and site 115. Each one of PE device 131 and PE device 132 may be multi-homed (e.g., dual-homed) to a plurality of sites, including site 110 and site 310. Each one of switch 311 and switch 312 may be directly or indirectly connected to one or more other switches and end hosts (e.g., MAC address devices) that are part of site 310 (but not shown in FIG. 3). Each one of PE devices 131 and 132 may also include a second port, a port 331*p* and port 332*p*, respectively. Port 331*p* may be unblocked and allow packets to flow to/from PE device 131 to CE device 321. At the same time, port 332*p* may be blocked and not allow packets to flow to and from PE device 132 to reach ring/site 310 through CE device 322.

A break may occur in link 230 that may split site 110 into site 1110 and site 110*b*. A protocol may run that may unblock port 132*p*. The unblocking may trigger PE device 132 to generate a TCN 1. PE device 132 may transmit TCN 1 to CE device 122. CE device 122 may forward TCN 1 to one or more devices on/connected to site 110*b* for the devices to flush their MAC tables. PE device 132 may not be able to transmit TCN 1 to CE device 322 because port 332*p* is blocked and/or because PE device 132 may know to not send to CE device 322 because it is connected through another port (port 332*p*) that has not been unblocked.

After the unblocking of port 132*p*, PE device 132 may also be triggered to generate the LDP MAC flush message to transmit to other PE devices connected to network 101. The LDP MAC flush message may allow the other PE devices to now transmit packets to site 110*b* through PE device 132. PE device 132 may specify in the LDP MAC flush message that only PE device 131 should generate and transmit a TCN 2 in response to receiving the LDP MAC flush message. This may be because PE device 131 is the only receiving PE device that was connected to formerly existing site 110 that now split and prompted the need to send the LDP MAC flush message (i.e., because PE device 131 is an affected PE device). PE device 131 and PE device 133 may receive the LDP MAC flush message. PE device 133 may flush its own MAC table and proceed to take no further action in response to the LDP MAC flush message. PE device 131 may flush its own MAC table and determine that it needs to generate TCN 2 in response to the LDP MAC flush message. By transmitting TCN 2 to CE device 121 and CE device 321, PE device 131 may cause all the MAC tables on/connected to site 110*a* and site 310 to be flushed. Flushing all the MAC tables on site 110*a* would allow end hosts connected to site 110*a* (e.g., MAC address device 141/host 221 and host 222) to be able to transmit packets to site 110*b* (i.e., hosts connected to site 110*b* (e.g., MAC address device 141/host 221 and host 222).

However, a failure on site 110 may not affect the functioning of site 310. In other words, the break of link 230 may not affect the ability of, for example, end hosts connected to/through switch 311 and switch 312 to transmit packets through switch 311 and CE device 321 to site 110*b* (since link 330 may remain operational and, therefore, able to transmit packets between switch 311 and switch 312). PE device 132 may also provide instructions regarding what ring(s) a receiving PE device (e.g., PE device 131) should (or should not) forward TCN 2 to in the LDP MAC flush message. PE device 132 may determine what rings/sites were affected by the break of link 230. PE device 132 may include ring identifier(s) (e.g., Ring ID(s)) of the affected rings in the LDP MAC flush message. In this case, PE device 132 may include a Ring ID (e.g., 110) corresponding to site 110 in the LDP MAC flush message.

PE device 131 may receive the LDP MAC flush message with the Ring ID(s) from PE device 132. PE device 131 may generate TCN 2 in response to the LDP MAC flush message. PE device 131 may determine based on the Ring ID 110 included in the LDP MAC flush message that TCN 2 should be transmitted to CE device 121. Accordingly, PE device 131 may transmit TCN 2 to CE device 121 that may forward it to all other devices with MAC tables on/connected to site 110*a*. The devices on/connected to site 110*a* may flush their MAC tables in response to TCN 2. PE device 131 may also determine based on the LDP MAC flush message that TCN 2 should not be sent to ring 310 because a Ring ID for ring 310 is not included in the LDP MAC flush message. Accordingly, the MAC tables stored/maintained by devices on ring 310, including CE devices 321 and 322 and switches 311 and 312, may not be flushed.

Figure 4:
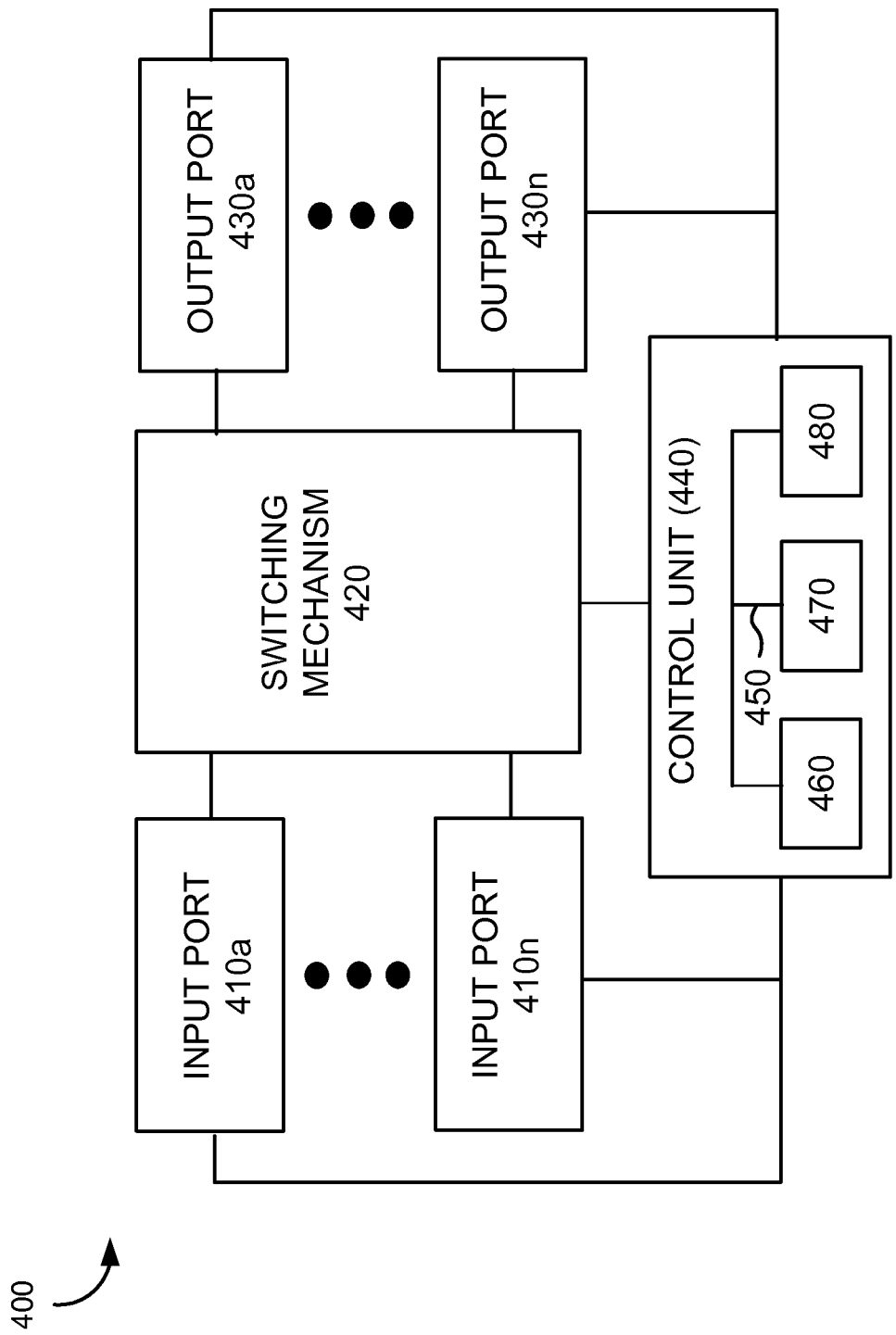
FIG. 4 is a diagram of example components of one or more of the devices of FIGS. 1-3.

FIG. 4 is a diagram of example components of a device 400 that may be associated one or more of the CE devices, the PE devices, and the switches illustrated in FIGS. 1-3. Device 400 may include input ports 410a-410n, a switching mechanism 420, output ports 430a-430n, and/or a control unit 440. Although FIG. 4 shows exemplary components of device 400, in other implementations, device 400 may contain fewer, different, or additional components than depicted in FIG. 4.

Input ports 410a-410n may be the points of attachments for physical links and may be the points of entry for incoming traffic. Switching mechanism 420 may interconnect input ports 410a-410n with output ports 430a-430n (e.g., port 131p and port 132 p). Output ports 430a-430n may store the traffic and may schedule the traffic on one or more output physical links. Control unit 440 may use routing protocols and may create a forwarding table (e.g., a MAC table) that is used in traffic forwarding.

Input ports 410a-410n may perform datalink layer encapsulation and decapsulation. Input ports 410a-410n may look up a destination address of incoming traffic (e.g., any type or form of data, such as packet or non-packet data) in a forwarding table (e.g., a MAC table) to determine its destination port (i.e., route lookup). In order to provide quality of service (QoS) guarantees, input ports 410a-410n may classify traffic into predefined service classes. Input ports 410a-410n may run datalink-level protocols and/or network-level protocols.

Switching mechanism 420 may include switching fabric that provides links between input ports 410a-410n and output ports 430a-430n. For example, switching mechanism 420 may include a group of switching devices that route traffic from input ports 410a-410n to output ports 430a-430n.

Output ports 430a-430n may store traffic before the traffic is transmitted on an output link. Output ports 430a-430n may include scheduling algorithms that support priorities and guarantees. Output ports 430a-430n may support datalink layer encapsulation and decapsulation, and/or a variety of higher-level protocols.

Control unit 440 may interconnect with input ports 410a-410n, switching mechanism 420, and output ports 430a-430n. Control unit 440 may perform control plane processing, including computing and updating forwarding tables, manipulating QoS tables, maintaining control protocols, etc. Control unit 440 may handle any traffic whose destination address may not be found in the forwarding table.

In one embodiment, control unit 440 may include a bus 450 that may include a path that permits communication among a processor 460, a memory 470, and a communication interface 480. Processor 460 may include a microprocessor or processing logic (e.g., an application specific integrated circuit (ASIC), field programmable gate array (FPGA), etc.) that may interpret and execute instructions, programs, or data structures. Processor 460 may control operation of device 400 and its components.

Memory 470 may include a random access memory (RAM) or another type of dynamic storage device that may store information and/or instructions for execution by processor 460; a read only memory (ROM) or another type of static storage device that may store static information and/or instructions for use by processor 460; a flash memory (e.g., an electrically erasable programmable read only memory (EEPROM)) device for storing information and/or instructions; and/or some other type of magnetic or optical recording medium and its corresponding drive. Memory 470 may also be used to store temporary variables or other intermediate information during execution of instructions by processor 460.

Communication interface 480 may include any transceiver-like mechanism that enables control unit 440 to communicate with other devices and/or systems. For example, communication interface 480 may include a modem or an Ethernet interface to a local area network (LAN). Additionally or alternatively, communication interface 480 may include mechanisms for communicating via a wireless network. Communication interface 480 may also include a console port that may allow a user to interact with control unit 440 via a command line interface. A user may configure device 400 via the console port.

Device 400 may perform certain operations, as described in detail below. Device 400 may perform these operations in response to processor 460 executing software instructions (e.g., computer program(s)) contained in a computer-readable medium, such as memory 470 a secondary storage device (e.g., hard disk, CD-ROM, etc.) or other forms of RAM or ROM. A computer-readable medium may be defined as a non-transitory memory device. A memory device may include memory space within a single physical memory device or spread across multiple physical memory devices.

The software instructions may be read into memory 470 from another computer-readable medium, such as a data storage device, or from another device via communication interface 480. The software instructions contained in memory 470 may cause processor 460 to perform processes that will be described later. Alternatively, hardwired circuitry may be used in place of or in combination with software instructions to implement processes described herein. Thus, implementations described herein are not limited to any specific combination of hardware circuitry and software.

Figure 5:
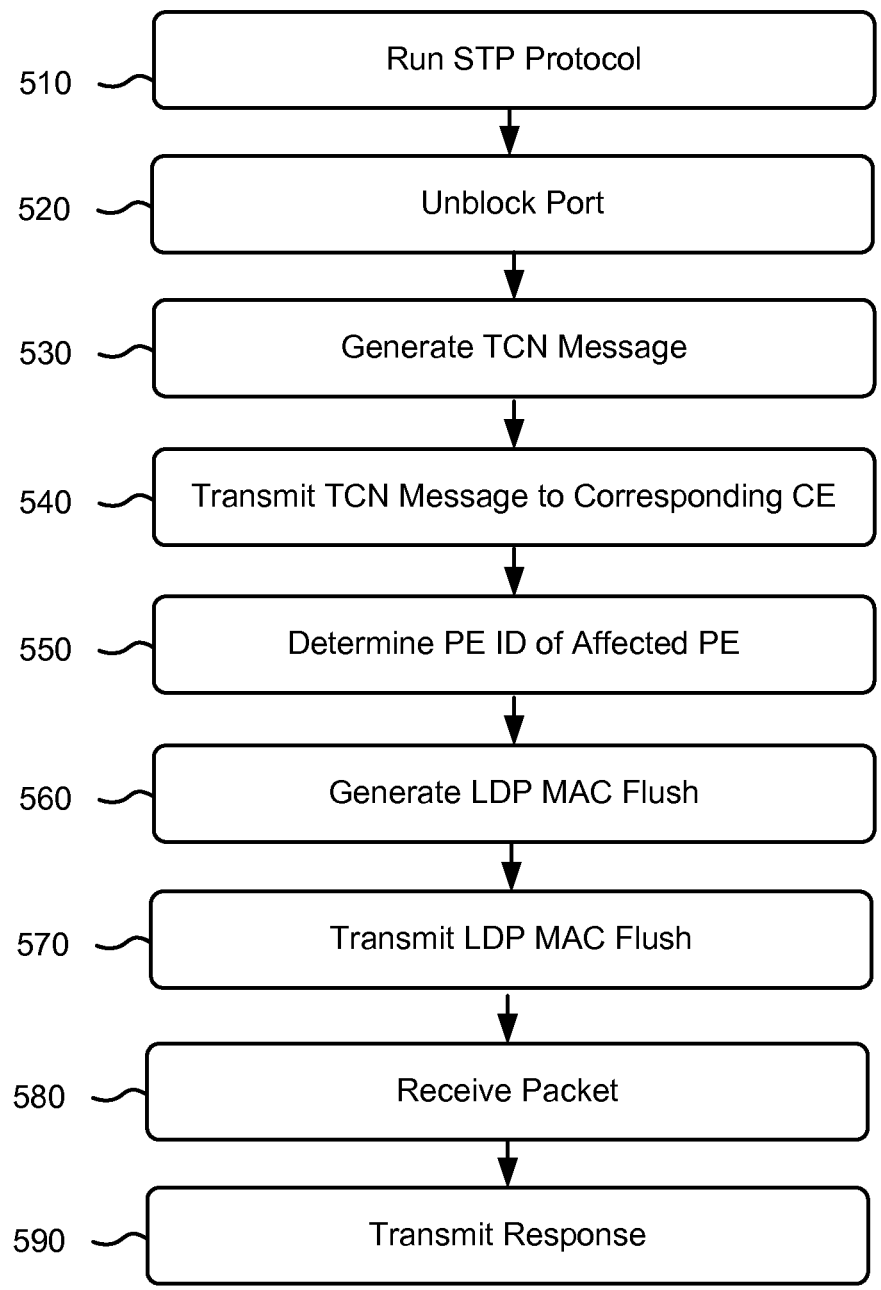
FIGS. 5 and 6 are flowcharts of example processes for propagating Label Distribution Protocol (LDP) MAC flush message(s) as TCN message(s) within an example portion of the system(s) of FIGS. 1-3.

FIG. 5 is a flowchart of an example process 500 for propagating LDP MAC Flush message(s) as TCN message(s) within an example portion of the system(s) of FIGS. 1-3. Process 500 may be performed by PE device 132 and/or by other devices shown (or not shown) in FIGS. 1-3 (e.g., CE device 122, switches on/part of site 110b). Process 500 of FIG. 5 may be triggered by a topology change event, the break of link 230 (i.e., break of site 110 into site 110a and 110b). Process 500 may include running of an STP protocol (block 510). After the break of link 230, an STP protocol may run on site 110a. The STP protocol may determine that end hosts on site 110b (e.g., MAC address device 142) may only be able to send packets outside of site 110b through PE device 132 (acting as a root bridge).

A port may be unblocked (block 520). After the STP protocol runs on site 110b, it may be determined that PE device 132 is not acting as a root bridge between site 110b and network 101 because traffic from CE device 122 to PE device 132 is blocked. The traffic may be blocked by port 132p being blocked and not allowing the traffic through PE device 132p. PE device 132 may unblock port 132p, due to the STP on site 110b, to allow PE device 132 to be a root bridge between site 110b (particularly, CE device 122) and network 101.

A TCN message may be generated (block 530). The unblocking of port 132p may be triggered by or signify a topology change event. The unblocking may allow end hosts on site 110b to transmit packets outside of site 110b (e.g., to site 110a) through PE device 132. In one implementation, the topology change event may trigger PE device 132 to generate a TCN message to be forwarded to all devices with MAC tables on/connected to site 110b (e.g., switches 212 and 214 and hosts 223 and 224 shown in FIG. 2). In another implementation, a TCN message may already exist and be stored by PE device 132, and, therefore, may be ready to be transmitted whenever a topology change event (e.g., unblocking of port 132p) occurs. The TCN message may include information to prompt a device receiving the TCN message to flush their MAC table and to keep forwarding the TCN message.

The TCN message may be transmitted to corresponding CE device 122 (block 540). PE device 132 may transmit the TCN message, in response to the topology change event, to CE device 122. In response to receiving the TCN message, CE device 122 may flush its own MAC table and forward the TCN message to one or more devices (e.g., switch 212 shown in FIG. 2) connected to CE device 122. In another implementation, CE device 122 may generate and transmit another message based on the TCN message to forward to the other devices connected to CE device 122. In this example, the receiving device (e.g., switch 212) may flush its own MAC table in response to receiving the TCN message from CE device 122. The receiving device may then continue to forward the TCN message to other devices (e.g., switch 214) that are connected to the receiving device. Devices within site 110b may continue to flush their own MAC tables and forward the TCN message until the end hosts of site 110b (e.g., hosts 223 and 224 shown in FIG. 2) receive the TCN message. Each one of the end hosts may flush their own MAC table in response to receiving the TCN message.

A PE ID of affected PE device 131 may be determined (block 550). Affected PE device 131 may be the other PE device (besides PE device 132 that is doing the determining) that was connected to original site 110 that was broken in two when link 230 broke. In one implementation, PE device 132 may store the PE ID for affected PE device 131. In another implementation, PE device 132 may run a protocol to determine the other affected PE device (e.g., PE device 131). Based on the determination of PE device 131 as the affected PE device, PE device 132 may request the PE ID of PE device 131 from PE device 131 or from another source.

An LDP MAC flush message may be generated (block 560). The topology change event, discussed above in reference to block 530, may also trigger PE device 132 to generate the LDP MAC flush message. The LDP MAC flush message may prompt receiving PE device(s) (e.g., PE device 131 and PE device 133) to flush their own MAC tables. The LDP MAC flush message may also prompt the receiving PE device(s) to take further action. For example, the LDP MAC may prompt a receiving PE device (e.g., PE device 131) to generate a TCN message to be sent to its corresponding CE device (e.g., CE device 121) and to be forwarded to other devices on/connected to a site (e.g., site 110a) connected/corresponding to PE device 131. The TCN message may prompt CE device 121 and the other devices on/connected to site 110a to flush their MAC tables.

PE device 132 may limit which of and how the receiving PE devices (e.g., PE device 131 and PE device 133) are prompted to take further action. PE device 132 may include, in the LDP MAC flush message, PE ID(s) of receiving PE devices (e.g., a PE ID of PE device 131) that need to generate a TCN message in response to receiving the LDP MAC flush message. PE device 132 may include the PE ID(s) of PE devices determined to have been affected by the break, as described above in reference to block 550. PE device 132 may include the PE ID of PE device 131 in the LDP MAC flush message.

PE device 132 may also specify in the LDP MAC flush message one or more affected ring(s) via which the generated TCN message should be transmitted. PE device 132 may include a Ring ID of each one of the affected rings. For example, PE device 132 may include a Ring ID corresponding to a ring for site 110a for PE device 131 to generate and forward a TCN message to CE device 121. PE device 132 may not include a Ring ID for a ring corresponding to ring/site 310 (shown in FIG. 3) in order for PE device 131 not to forward any TCN message to CE device 321 (also shown in FIG. 3) in response to the LDP MAC flush message.

The LDP MAC flush message may be transmitted (block 570). PE device 132 may transmit the generated LDP MAC flush message to all other PE devices connected to network 101 (in the VPLS), including PE device 131 and PE device 133. PE device 131 and PE device 133 may flush their own MAC tables in response to receiving the LDP MAC flush message. PE device 131 may determine, based on the LDP MAC flush message, whether PE device 131 should generate and transmit a TCN message in response to receiving the LDP MAC flush message. PE device 131 may make the determination based on whether the LDP MAC flush message includes a PE ID corresponding to PE device 131. Based on the determination, PE device 131 may generate the TCN message. PE device 131 may also determine, based on the LDP MAC flush message, that PE device 131 should forward the TCN message only towards site 110a, and not towards ring/site 310, based on the Ring ID included in the LDP MAC flush message corresponding to site 110a. CE device 121 may forward the TCN message down through site 110a until the end hosts (e.g., hosts 221 and 222) are reached. As a result, all the MAC tables stored/maintained by devices on/connected to site 110a may be flushed. PE device 133 may determine based on the LDP MAC flush message that it should not generate and transmit a TCN message because a PE ID corresponding to PE device 133 is not included in the LDP MAC flush message.

A packet may be received (block 580). After the flushing of the MAC tables on site 110a, an end host on/connected to site 110a (e.g., host 221 shown in FIG. 2) may transmit a packet towards an end host on/connected to site 110b (e.g., host 224 shown in FIG. 2). Since the MAC tables are flushed, there are no predefined routes for the packet to be transmitted. As a result, the packet will be flooded by a receiving device in all directions until the end host 224 is reached. For example, host 221 may initially transmit the packet to switch 213. Switch 213 may forward the packet to switch 211 and any other switch to which switch 213 may be connected. Switch 211 may receive the packet and forward it down the broken link 230 towards switch 212 and towards CE device 121. Although the packet will be dropped before reaching switch 212, it will reach host 224 through CE device 121, PE device 131, and network 101. PE device 132 may receive the packet through network 101 and forward it towards host 224 that is on/connected to site 110b.

A response may be transmitted (block 590). The MAC tables of devices on/connected to site 110b may be updated based on the packet received from host 221. Host 224 may transmit a response to host 221 in reply to the packet. The updated MAC tables may provide a route for the response to be transmitted back to host 221. As a result, host 224 may transmit the response to switch 214. Switch 214 may forward the response to switch 212. Based on its own MAC table, switch 212 may know that it needs to forward the response only to CE device 122 for the response to reach host 221. CE device 122 may receive the response and forward it through port 132*p* to PE device 132. PE device 132 may transmit the response through network 101 to PE device 131 for the response to reach host 221. On the response's route to host 221, the devices on/connected to site 110*a* (e.g., PE device 131, CE device 121, switch 211, switch 213, host 221) handling the transmission of the response may update their MAC tables based on/for the origin of the response (e.g., host 224).

Figure 6:
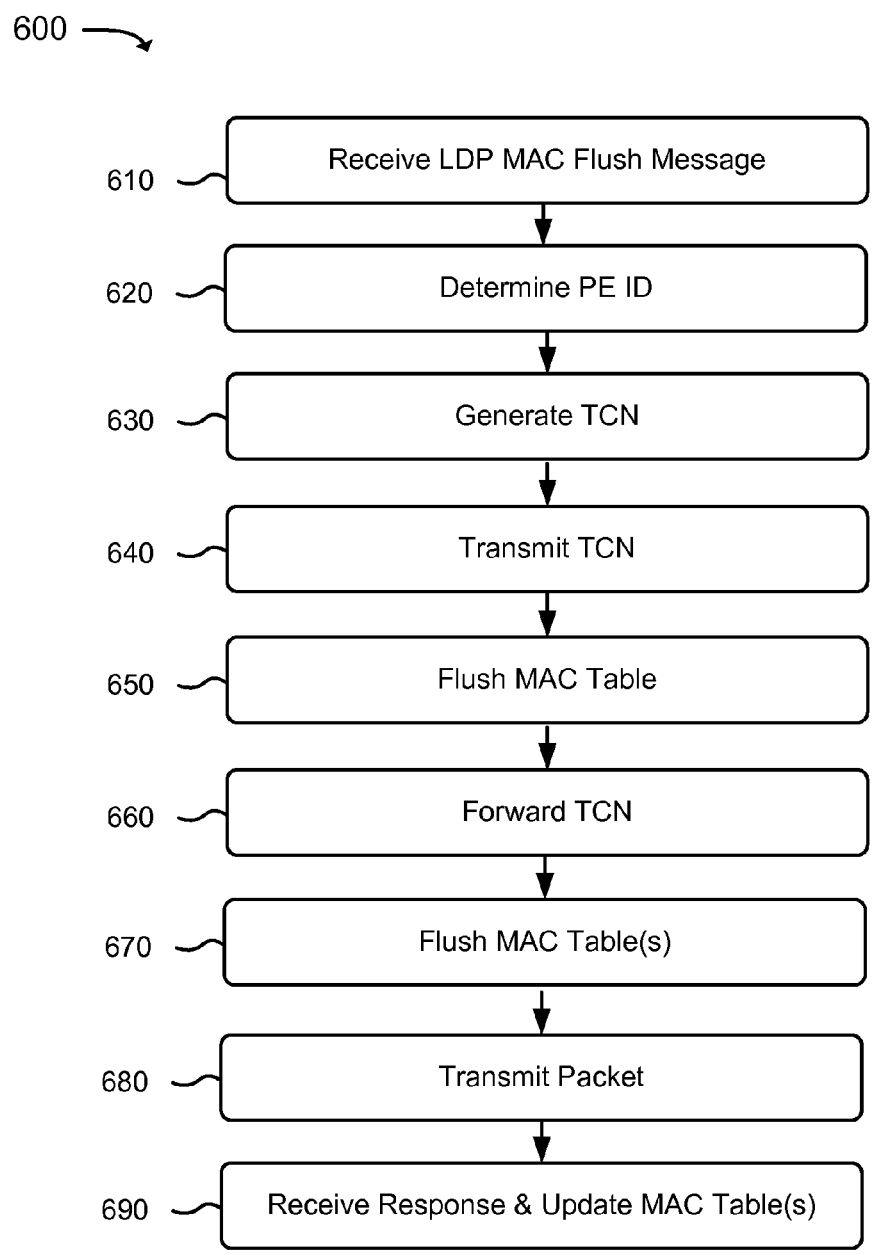

FIG. 6 is a flowchart of an example process 600 for propagating an LDP MAC flush message as a TCN message within an example portion of the systems of FIGS. 1-3. Process 600 may be performed by PE device 131 and by other devices shown (or not shown) in FIGS. 1-3 (e.g., CE device 121, switches on/part of site 110*a*). Process 600 may include receiving an LDP MAC flush message (block 610). PE device 132 may transmit the LDP MAC flush message to PE devices connected to network 101, including PE device 131, when port 132*p* is unblocked. PE device 131 may receive the LDP MAC flush message. PE device 131 may flush its own MAC table in response to receiving the LDP MAC flush message.

A PE ID may be determined (block 620). PE device 131 may determine whether to generate a TCN message to transmit to its corresponding CE device (e.g., CE device 121) based on the LDP MAC flush message. To do so, PE device 131 may determine what PE ID(s) are included in the LDP MAC flush message, and specifically whether the LDP MAC flush message includes a PE ID (e.g., 131) corresponding to PE device 131.

A TCN message may be generated (block 630). If the LDP MAC flush message includes PE ID 131 that corresponds to PE device 131, PE device 131 may determine that it needs to generate a TCN message to transmit to its corresponding CE device 121. PE device 131 may generate the TCN message based on the LDP MAC flush message. The TCN message may prompt a receiving device to flush its own MAC table (if it has one) and to forward the TCN message (or another message based on the TCN message) to other devices connected to the receiving device.

The TCN message may be transmitted (block 640). After generating the TCN message, PE device 131 may determine what specific rings (e.g., ring corresponding to site 110*a* and ring/site 310 shown in FIG. 3) to which to forward the TCN messages. PE device 131 may make the determination to forward the TCN message to a specific ring based on whether the LDP MAC flush message includes a Ring ID of the specific ring. For example, the LDP MAC flush message may include a Ring ID corresponding to site 110*a*. As a result, PE device 131 may transmit the TCN messages to CE device 121 for all the MAC tables maintained/stored by devices on/connected to site 110*a* to be flushed. The LDP MAC flush message may not include a Ring ID corresponding to ring/site 310. Therefore, PE device 131 may determine that it should not forward the TCN message to CE device 321 (shown in FIG. 3) so as not to flush the MAC tables of devices on/connected to ring/site 310, including switches 311 and 312.

A MAC table may be flushed (block 650). In response to the TCN message received from PE device 131, CE device 121 may flush its own MAC table.

The TCN message may be forwarded (block 660) and other MAC table(s) may be flushed (block 670). After CE device 121 receives the TCN message, CE device 121 may forward the TCN message to one or more switches (e.g., switch 211 shown in FIG. 2). In another implementation, CE device 121 may generate another message based on the TCN message to transmit to switch 211. Switch 211 may flush its own MAC table in response to receiving the TCN message from CE device 121. Switch 211 may then forward the TCN message to one or more other devices (e.g., switch 213) that are connected to switch 211. The one or more other devices, including switch 213, may flush its own MAC table and keep forwarding the TCN message. The TCN message may be forwarded all through site 110*a* until end hosts of site 110*a* (e.g., hosts 221 and 222 shown in FIG. 2) receive the TCN message. Switch 213 may forward the TCN message to hosts 221 and 222. Hosts 221 and 222 may flush their own MAC table(s) in response to receiving the TCN message.

A packet may be transmitted (block 680). After the flushing of the MAC tables of devices on/connected to site 110*a* (e.g., including switches 211 and 213 and hosts 221 and 222), hosts 221 and 222 may now transmit a packet to one or more end hosts, including hosts 223 and 224, on/connected to site 110*b* without the packet being dropped (e.g., by switch 211 attempting to transmit the packet to switch 212 via link 230). For example, host 221 may transmit a packet to host 224. The packet may be flooded from host 221, from switch 213, from switch 211, and from CE device 121. Thereafter, the packet may reach PE device 131. PE device 131 may transmit the packet to PE device 132 via network 101. The packet may be transmitted from PE device 132 down to host 224.

A response may be received and MAC table(s) may be updated (block 690). Host 224 may transmit the response to the packet, received from host 221, to host 221. PE device 131 may receive the packet being transmitted from PE device 132 via network 101. PE device 131 may update its own MAC table for host 224. PE device 131 may then transmit the response to CE device 121. CE device 121 may update its own MAC table and transmit the response to switch 211. Switch 211 may update its own MAC table and transmit the response to switch 213. Switch 213 may update its own MAC table and transmit the response to host 221. Finally, host 221 may receive the response and update its own MAC table as well.

Figure 7:
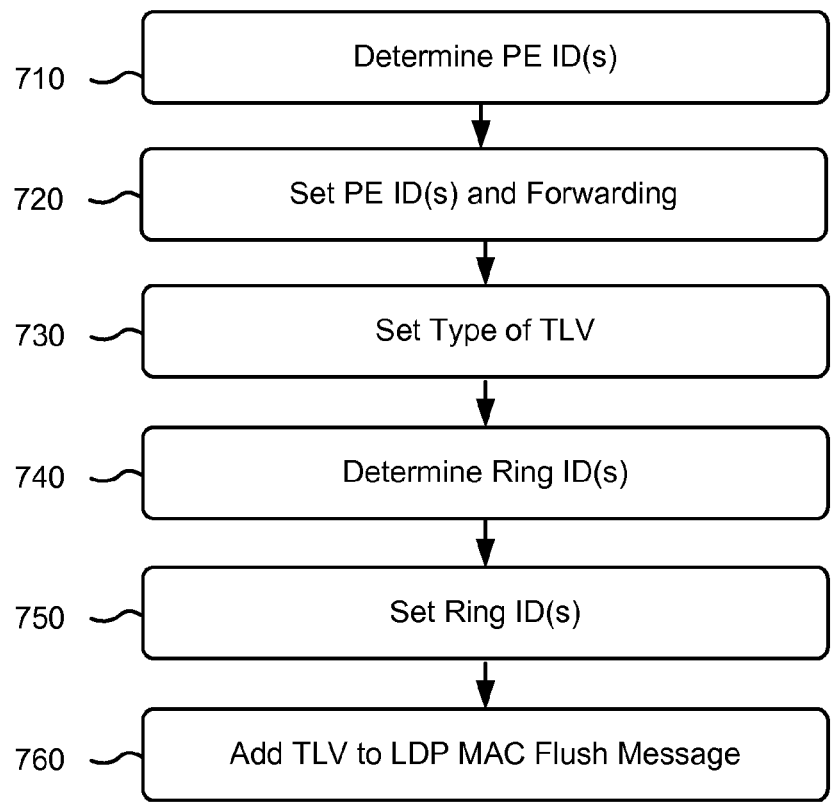
FIG. 7 is a flowchart of an example process for generating an LDP MAC Flush message, consistent with an implementation of the example process depicted in FIG. 5.
Figure 8:
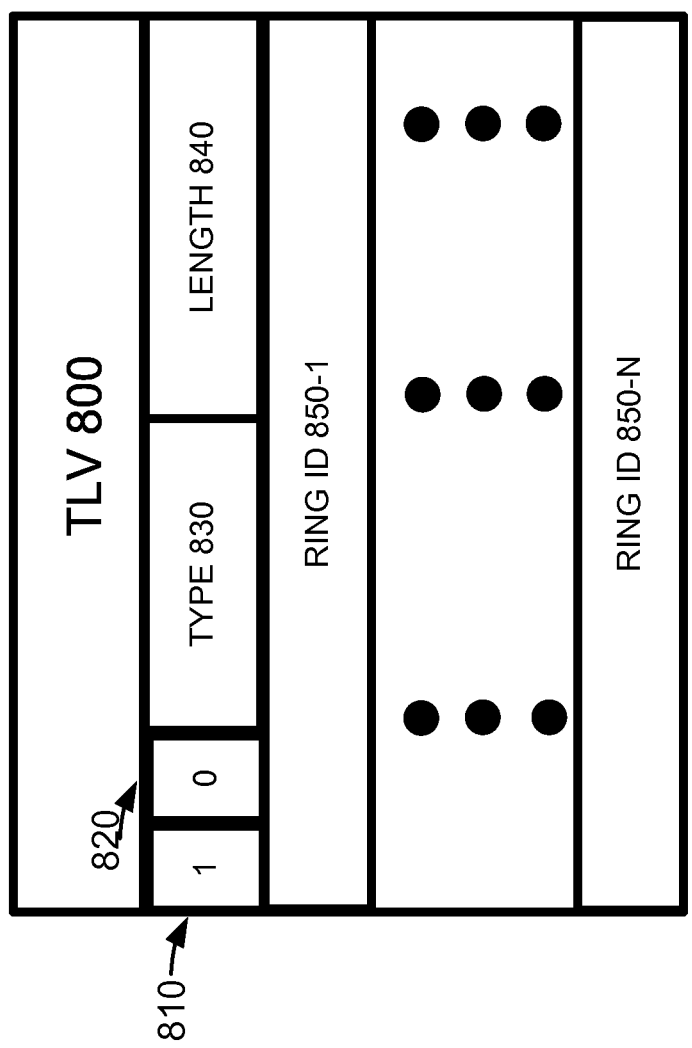
FIG. 8 illustrates an example data structure according to an implementation described herein.

FIG. 7 is a flowchart of an example process 700 for generating an LDP MAC Flush message. FIG. 7 will be described with reference to FIG. 8. FIG. 8 illustrates an example data structure, a Type-Length-Value (TLV) 800, which may be used to implement process 700. Process 700 may be performed by PE device 132 and/or by other devices shown (or not shown) in FIGS. 1-3 (e.g., CE device 122, switches on/part of site 110*b*). Process 700 of FIG. 7 may correspond to blocks 550 and 560 of FIG. 5. Process 700 may be a part of a process of generating LDP MAC flush message(s) to be transmitted to one or more other PE devices (e.g., PE devices 131 and 133) connected to network 101. PE device 132, via process 700, may generate TLV 800 to include in the LDP MAC flush message(s). TLV 800 may provide instructions to receiving PE devices 131 and 133 regarding what further actions they should take besides flushing their own MAC tables.

Process 700 may include determining PE-ID(s) (block 710). Block 710 of FIG. 7 may correspond to block 550 of FIG. 5. PE device 132 may determine what site(s) were affected by the break of link 230 (and the unblocking of port 132*p*) besides site 110*b* corresponding to PE device 132. For example, PE device 132 may determine that site 110*a* was affected by the break of link 230 and may determine that site 115 was not affected by the break of link 230. PE device 132 may then determine what PE devices (e.g., PE device 131) on/connected to network 101 correspond to the affected site(s). In the aforementioned example, PE device 132 may determine that PE device 131 corresponds to affected site 110a. PE device 132 may then determine a PE ID corresponding to PE device 131 (e.g., by sending a request for the PE ID to PE device 131). In another implementation, PE device 132 may store PE IDs that should be included in the LDP MAC flush message(s) when the breaking of link 230 (and the unblocking of port 132p) occurs.

PE-ID(s) and forwarding may be set (block 720). TLV 800 may include an ID field 810 and a forward field 820. PE device 132 may set ID field 810 to, for example, 1 to correspond to the PE ID of PE device 131. Based on ID field 810, PE device 131 may know that additional instructions provided by the TLV are meant for it because its PE ID (1) is included in TLV 800. In contrast, based on ID field 810, PE device 133 may determine that the TLV was not meant for it because its PE ID (e.g., 3) was not included in the TLV. As a result, PE device 133 may ignore TLV 800 just by reading ID field 810. PE device 132 may set forward field 820 to a particular value (e.g., zero). TLV 800 may include a bit to notify receiving device(s), including PE devices 131 and 133, whether TLV 800 should be forwarded to other devices. Herein, the information included in TLV 800 may only be meant for PE devices whose PE ID is included in unknown bit 810, like PE device 131. By setting the forward field 820 to the particular value (e.g., zero), TLV 800 may not be forwarded by either one of devices 131 and 133 to any other device.

Type of TLV may be set (block 730). TLV 800 may also include a type field 830. An organization (e.g., Internet Assigned Numbers Authority (IANA)) may allocate an identifier to correspond specifically to a type for TLV 800. PE device 132 may set the identifier for the type corresponding to TLV 800. As a result, receiving PE devices 131 and 133 may know based on type field 830 that TLV 800 provides information regarding what receiving PE devices should generate a TCN message and to which rings the TCN messages should be forwarded. TLV 800 may also include a length field 840. Length field 840 may specify the length (e.g., in octets) of a value, specifying instructions (e.g., instructions in TLV 800 for receiving PE devices 131 and 133), of TLV 800.

Ring ID(s) may be determined (block 740). For example, PE device 132 may determine to which ring(s) a generated TCN message should be propagated to by PE devices 131. PE device 132 may determine that PE device 131 should send the generated TCN message only down to a ring corresponding to site 110a (and not ring/site 310), as described above with reference to FIG. 3. PE devices 132 may determine the Ring ID(s) of those rings. In another implementation, the Ring IDs that should be included in TLV 800 by PE device 132 may be pre-configured and stored by PE device 132. Each Ring ID may include a four octet unsigned number that identifies its corresponding ring.

Ring ID(s) may be set (block 750). TLV 800 may include Ring ID fields 850-1 through 850-N to specify, in one of Ring ID fields 850-1 through 850-N, a Ring ID of each ring to which a TCN message should be sent. For example, PE device 132 may set Ring ID field 850-1 to a Ring ID that corresponds to site 110a. PE device may set Ring ID fields 850-2 through 850-N to not correspond to any other rings.

TLV may be added to the LDP MAC flush message (block 760). After setting ID field 810, forward field 820, type field 830, length field 840, and one or more of Ring ID fields 850-1 through 850-N, PE device 132 may include the, now generated, TLV 800 to an LDP MAC flush message. PE device 132 may transmit the LDP MAC flush message with the same TLV 800 to any one of PE devices connected to network 101, including PE devices 131 and 133. PE device 131 may generate and transmit a TCN message to CE device 121 based on TLV 800. PE device 133 may ignore TLV 800.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 5-7, the order of the blocks may be modified in other implementations. Further, non-dependent blocks may be performed in parallel.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   determining, by a device, an identifier of a provider edge device affected by a topology change event;
   generating, by the device, a first message based on the identifier of the provider edge device,
      the first message including information to prompt the provider edge device to generate a second message based on the first message, and
      the second message being a topology change notification message; and
   transmitting, by the device, the first message to the provider edge device,
      the first message causing the provider edge device to generate the topology change notification message, and
      the provider edge device determining not to generate a different topology change notification message based on a third message, received by the provider edge device, when the third message does not include the identifier of the provider edge device.

2. The method of claim 1, further comprising:
unblocking a port of the device after the topology change event.

3. The method of claim 2, where unblocking the port comprises:
determining, after the topology change event, that traffic is blocked from a customer edge device to the device, and
unblocking the port of the device based on determining that traffic is blocked from the customer edge device to the device.

4. The method of claim 1, further comprising:
transmitting, based on the topology change event, another topology change notification to a customer edge device connected to the device,
the other topology change notification message prompting the customer edge device to flush a media access control (MAC) table of the customer edge device.

5. The method of claim 1,
where the first message further includes a ring identifier for a site corresponding to the provider edge device, and
where the provider edge device forwards the second message to a customer edge device connected to the site based on the ring identifier.

6. The method of claim 1, further comprising:
receiving, from the provider edge device, a packet that originated at a first host, and
forwarding the packet towards a second host via a customer edge device connected to the device.

7. A device comprising:
a processor to:
receive a particular message from a provider edge device that identified a topology change event;
generate a topology change notification message based on the particular message;
transmit the topology change notification message to a customer edge device,
the topology change notification message including information for prompting flushing of one or more routing tables of one or more devices connected to a site associated with the customer edge device;
receive a different message; and
determine not to generate and transmit another topology change notification message based on the different message.

8. The device of claim 7, where the processor is further to:
flush a media access control (MAC) table of the device based on receiving the particular message.

9. The device of claim 7, where, when generating the topology change notification message, the processor is to:
determine that the particular message includes an identifier that corresponds to the device, and
generate the topology change notification message based on determining that the particular message includes the identifier that corresponds to the device.

10. The device of claim 7, where, when transmitting the topology change notification message, the processor is to:
determine that the particular message includes a ring identifier that corresponds to the site, and
transmit the topology change notification message to the customer edge device based on determining that the particular message includes the ring identifier that corresponds to the site.

11. The device of claim 7, where the processor is further to:
receive, from the customer edge device, a packet that originated at a first host, and
transmit the packet to a second host via the provider edge device.

12. A non-transitory computer-readable medium storing instructions, the instructions comprising:
one or more instructions that, when executed by at least one processor of a first provider edge device, cause the at least one processor to:
identify a topology change event;
generate a particular message based on the topology change event; and
transmit the particular message to a second provider edge device,
the particular message causing the second provider edge device to generate and transmit a topology change notification message based on the particular message, and
the second provider edge device determining not to generate and transmit a different topology change notification message based on a different message received by the second provider edge device.

13. The non-transitory computer-readable medium of claim 12,
where the topology change event includes a break of a connection between a first affected site and a second affect site,
where the first affected site corresponds to the first provider edge device, and
where the second affected site corresponds to the second provider edge device.

14. The non-transitory computer-readable medium of claim 12, where the one or more instructions to generate the particular message based on the topology change event comprise:
one or more instructions that, when executed by the at least one processor, cause the at least one processor to:
determine a site affected by the topology change event,
determine that the second provider edge device corresponds to the site,
determine an identifier of the second provider edge device, and
include the identifier of the second provider edge device in the particular message.

15. The non-transitory computer-readable medium of claim 12, where the one or more instructions to generate the particular message based on the topology change event comprise:
one or more instructions that, when executed by the at least one processor, cause the at least one processor to:
unblock a port of the first provider edge device based on the topology change event,
the port being connected to a customer edge device that corresponds to the first provider edge device.

16. The non-transitory computer-readable medium of claim 12, where the instructions further comprise:
one or more instructions that, when executed by the at least one processor, cause the at least one processor to:
generate another topology change notification message based on the topology change event; and
transmit the other topology change notification message to a customer edge device to prompt flushing of a routing table.

17. A system comprising:
a device to:
- determine a provider edge identifier of a provider edge device based on a topology change event;
- set a first field, of a data structure, to the provider edge identifier;
- determine a ring to which a topology change notification message should be propagated to by the provider edge device;
- determine a ring identifier of the ring;
- set a second field, of the data structure, to the ring identifier;
- add the data structure to a Label Distribution Protocol message; and
- transmit the Label Distribution Protocol message to the provider edge device,
  - the provider edge device determining not to generate another topology change notification message based on a different Label Distribution Protocol message when the different Label Distribution Protocol message does not include the provider edge identifier.

18. The system of claim 17, where the device is further to:
set a bit, of the data structure, to notify the provider edge device that the data structure is to be forwarded to one or more other devices.

19. The system of claim 17, where the device is further to:
set a third field, of the data structure, to indicate that the provider edge identifier is to generate the topology change notification message based on the data structure.

20. The system of claim 17, where, when determining the provider edge identifier of the provider edge device, the device is to:
- determine a site affected by the topology change event,
  - the topology change event being a break of a link associated with the site, and
  - the site being the ring,
- determine that the provider edge device corresponds to the site, and
- send a request for the provider edge identifier to the provider edge device.

* * * * *